United States Patent Office.

JAMES G. TARR AND AUGUSTUS H. WONSON, OF GLOUCESTER, MASSACHUSETTS.

*Letters Patent No.* 40,515, *dated November* 3, 1863; *reissue No.* 2,722, *dated August* 6, 1867.

IMPROVED PAINT FOR SHIPS' BOTTOMS.

The Schedule referred to in these Letters Patent and making part of the same.

TO ALL WHOM IT MAY CONCERN:

Be it known that we, JAMES G. TARR and AUGUSTUS H. WONSON, of Gloucester, in the county of Essex, and State of Massachusetts, have invented an improved Paint for Ships' Bottoms; and we do hereby declare that the following is a full and exact description thereof, and of the mode of making the same.

The object of our invention is to prevent the fouling of the bottoms of ships by the adhesion of barnacles, sea-weeds, and other substances, and this we effect by means of our improved paint or composition, which is applied to the hull of the vessel with a brush in the ordinary manner.

The substances used in making this paint are tar, dry oxide of copper, and naphtha or benzine. The union or mixture of these substances is effected in a peculiar manner, as herein described.

We have found by experiment that when the tar and naphtha or benzine are mixed together, and the copper oxide immediately added to it, the substances cannot be so mixed or incorporated as to make a paint of uniform consistence. It cannot, when thus mixed, be laid on in a smooth and uniform coat with a brush.

When one hundred gallons of paint is to be made, we proceed as follows: Into a vat or tank of suitable size we pour forty gallons of Stockholm tar, and mix with this thirty gallons of benzine or naphtha, which must be added gradually, a few gallons at a time, and rapidly stirred. When the benzine or naphtha is all put in, the mixture should be stirred for about half an hour, or until the ingredients are well incorporated. The vat must then be closed with a tight-fitting cover and allowed to stand for about twenty-four hours. During this time a deposit takes place, the residuum consisting principally of heavy matters that are not soluble in the benzine or naphtha, the quantity thus deposited being usually about one gallon to each ten gallons of the mixture. The part remaining liquid is now drawn into another vat, and thirty gallons of dry oxide of copper, finely pulverized, are added to it, and after being well stirred, the paint is ready for use.

We prefer to employ the pyritous friable ores, which are easily reduced to fine powder. About seven gallons of paint prepared as above described are required for one coat on a vessel of one hundred tons.

We do not wish to be understood as limiting ourselves to the use of our improved paint as produced by the use of the peculiar method of mixing hereinbefore described. The advantage of using an oxide of copper, such as we have herein described, is that there are contained in it mineral and earthy substances, such as various other metallic oxides, sulphur, &c., which serve to divide the particles of oxide of copper, interposing between them substances which dissolve more slowly than they do, or which do not dissolve at all, it being desirable that the solution should be less rapid than would take place with a pure oxide of copper, and yet sufficient to give the necessary protection to the bottom. The proportion in which these earthy and mineral matters are mixed with the copper oxide will vary greatly with the quality of the ore used, and it may be found desirable that it should do so with reference to varying lengths of voyages which are to be made and the nature of the waters in which they are to be made. All that is needed is that there shall be a proper base, such as these earthy matters furnish, to retard the solution of the copper oxide and to give durability to the paint. The proportions of the tar and benzine may also be greatly varied, as they are designed merely for a vehicle or medium. Some wood tar is so dense as to require quite thin naphtha or benzole, and some so thin as to allow the use of heavy naphtha or tar oil. The result of mixing should be the production of a vehicle of about the consistency of linseed oil.

We are aware that salts of copper, such as verdigris, mixed with linseed oil, have been long used for protecting ships, and that a patent has been granted to Charles Wettersted for the use of pure metallic alloys of copper and other metals, in the form of powder, mixed with vegetable tar and linseed oil, boiled with litharge or with naphtha, for such purpose. In section 8 of his specification he refers to the protection of iron by the use of a mixed paint composed of metallic alloys and pure oxide of copper, prepared in a particular manner, as an outer coating or glazing paint to be applied upon his paint before mentioned. Reference is also made to the galvanic protection his metallic alloys afford, and a ship's paint which may be made of pulverized antimony and pure oxide of copper, which, however, by reason of the ready solubility of the antimony in water, could not make a practical ship's paint. We disclaim all such mixtures as are here referred to. Our invention is based upon the use of oxide of copper yielding a poisonous solution in water with great rapidity, together with such earthy and mineral matters as separate the particles of the oxide and retard such solution, thus obtaining a paint which protects bottoms practically, as well as copper sheathing or yellow metal, and at much less cost.

What we claim, is—

A paint made of oxide of copper, with a basis and medium substantially as described.

JAMES G. TARR,
AUGUSTUS H. WONSON.

Witnesses:
J. B. CROSBY,
FRANCIS GOULD.